(12) United States Patent
Berta et al.

(10) Patent No.: US 10,247,166 B2
(45) Date of Patent: Apr. 2, 2019

(54) DEVICE FOR REVERSING A BLADE OF A RUNNER UNIT

(71) Applicant: ALSTOM Renewable Technologies, Grenoble (FR)

(72) Inventors: Jean Francois Berta, Saint Jean DeMuzols (FR); Jacques Bremond, Saint-Egreve (FR)

(73) Assignee: GE RENEWABLE TECHNOLOGIES, Grenoble (FR)

( * ) Notice: Subject to any disclaimer, the term of this patent is extended or adjusted under 35 U.S.C. 154(b) by 411 days.

(21) Appl. No.: 15/161,428

(22) Filed: May 23, 2016

(65) Prior Publication Data
US 2016/0356260 A1    Dec. 8, 2016

(30) Foreign Application Priority Data

Jun. 3, 2015 (EP) .................................... 15290145

(51) Int. Cl.
*F03B 3/14* (2006.01)
*F03B 13/26* (2006.01)
*F03B 3/06* (2006.01)
*F03B 13/10* (2006.01)

(52) U.S. Cl.
CPC ................ *F03B 3/145* (2013.01); *F03B 3/06* (2013.01); *F03B 13/10* (2013.01); *F03B 13/264* (2013.01); *F05B 2260/4031* (2013.01); *F05B 2270/604* (2013.01); *Y02E 10/223* (2013.01); *Y02E 10/28* (2013.01)

(58) Field of Classification Search
CPC .................................... F03B 3/14; F03B 3/145
See application file for complete search history.

(56) References Cited

U.S. PATENT DOCUMENTS

| 2,951,380 | A |  | 9/1960 | Louarn |  |
| 2009/0016884 | A1 | * | 1/2009 | Yan | .......................... F03D 3/067 416/147 |

FOREIGN PATENT DOCUMENTS

| AU | 2014259522 A1 |  | 5/2015 |
| EP | 2 871 356 A1 |  | 5/2015 |
| FR | 660 012 A |  | 7/1929 |
| GB | 750951 | * | 1/1954 |

\* cited by examiner

*Primary Examiner* — Jason D Shanske
*Assistant Examiner* — Brian O Peters
(74) *Attorney, Agent, or Firm* — GE Global Patent Operation; Douglas D. Zhang

(57) ABSTRACT

The present invention generally relates to a runner unit of a tidal power plant, and more particular to a device for reversing a blade of the runner unit. The device according to the invention is lighter and more efficient with respect to known solutions which involve articulated mechanisms as it is based on an auxiliary servomotor including a reciprocating linear rack which acts on the blade to be reversed.

10 Claims, 11 Drawing Sheets

DEVICE FOR REVERSING A BLADE OF A RUNNER UNIT

CROSS-REFERENCE TO RELATED APPLICATIONS

This application claims priority to European Patent Application No. 15290145.0 filed Jun. 3, 2015, the contents of which are hereby incorporated in its entirety.

TECHNICAL FIELD

The present invention generally relates to a runner unit of a tidal power plant, and more particular to a device for reversing a blade of the runner unit.

BACKGROUND

As well known, tidal power plants are arranged to convert into electricity the energy of tides. To this purpose, in case of a tidal lagoon, turbine housing may be arranged between the sea and the lagoon basin. The turbine housing may include a bulb runner unit comprising a plurality of blades fit thereon which are moved by the flow of water. The bulb runner is integral to a rotating shaft which cooperates with an electricity generator. Depending on the tidal level, when the water level (also known as "head") of the sea rises with respect to the level of the lagoon, water can start flowing through the turbine to produce energy. Similarly, as the sea level starts to fall, a tidal head can be created by holding water back in the lagoon until a sufficient head is formed. Thus the process can be reversed and the water flows in the opposite direction from the lagoon to the sea through the turbine. In this way the generation of electricity is maximised, as it occurs with the flow of water in both senses.

However, the blades fit to the bulb unit usually have a fixed direction with respect to the flow of water. The consequence of such arrangement usually ensures an acceptable efficiency when the runner is operating in the direct mode, which is when the water flows from the lagoon to the sea, but at the same time a significant decrease of efficiency is experienced when operating in the reverse mode, since the same inclination of the blades is maintained in both operating modes, or at least the blades present a profile optimised for a flow in the opposite direction.

Known mechanisms installed in the runner unit usually allow an angle of rotation generally limited to values which are less than 40 degrees and in any case much less than 180 degrees because of the high friction occurring around the dead centres of the control mechanisms. A complete inversion of the blade would correspond to a rotation angle of more than 180 degrees, for example on the order of 220 degrees.

An attempt to solve the aforementioned technical problem is described in patent publication U.S. Pat. No. 2,951,380, which will be now discussed.

With reference to FIG. 1 and the sequence illustrated in FIGS. 2a to 2f, the control mechanism generally comprises a main servomotor 12 including a piston 11 which controls the position of the blade through a rod 10. Connected to the rod 10 is a cross-head 8. Each blade includes a journal 3 supported by bearings and a lever 6 is keyed to the journal between the bearings. A connecting-rod 7 is articulated at one end to the lever 6 and to the other end to the cross-head 8. Such crank gear has a dead centre, and for this reason the control mechanism comprises an auxiliary servomotor. In particular, the latter comprises a tooth sector 13 secured to the lever 6, situated on the same side of the lever 6 and is symmetrical to the axial plane of the crank. Furthermore, an additional crank 14 is secured to toothed sector 15 and rotates on a pin 16 mounted on the hub. A connecting-rod 17 is articulated at the end of the crank 14 and is driven by an auxiliary servomotor 18. As it is clearly indicated in the sequence of FIGS. 2a-2f, toothed sectors 13 and 15 interact solely when the main servomotor 12 drives the lever 6 in its dead position (FIGS. 2b-2e). Then the auxiliary mechanism is driven such that toothed sector 15 meshes with sector 13 and the dead centre is passed. With the cooperation of the two mechanisms a complete inversion of the blade, with an angle greater than 180 degrees, is achieved.

However, the disclosed mechanism has technical disadvantages. In fact, the auxiliary mechanism is based on a rotative gear, which is the toothed sector 15, in order to enable the further rotation of the lever 6 and hence pass the dead zone. For such reason, the auxiliary servomotor, which comprises the servomotor 18 acting on the connecting-rod 17, must include the crank 14 articulated thereto.

It will be appreciated that such pivot in the mechanism inevitably involves the presence of two elements moving, that is the articulated rod 17 and the crank 14 on which the meshing gear is provided, which makes the mechanism heavier and may cause wear at the interface of the coupling rod-crank. Furthermore, the hub must be designed to also support the pin 16 acting as pivot of the crank 14, and the pin 20 acting as pivot of the servomotor 22 as they are both fixed thereto.

SUMMARY OF THE INVENTION

It is an object of the present invention to solve the aforementioned technical problems by providing a device for reversing a blade for a runner unit as substantially defined according to independent claim 1.

It is a further object of the present invention to provide a runner unit as substantially defined in dependent claim 10.

According to an aspect of the invention, this object is obtained by a device for reversing a blade of a runner unit, comprising an annular lever fixed to a trunnion portion of the blade and rotatably mounted on the runner unit; a main servomotor comprising a piston adapted to reciprocate along a shaft of the runner unit and coupled to the annular level such to cause a first rotation of the blade until the piston reaches a dead zone position; an auxiliary servomotor arranged to cause a further rotation of the blade; wherein the auxiliary servomotor comprises a reciprocating linear rack configured to cooperate with a toothed sector provided on the annular level when the piston is at or in proximity of said dead zone position.

According to a preferred aspect of the invention, the linear rack comprises a rod having a rack element fixed at its end.

According to a preferred aspect of the invention, the auxiliary servomotor comprises a servomotor body hosting a reciprocating piston integral to the linear rack.

According to a preferred aspect of the invention, the linear rack is articulated by means of a first pivot on the servomotor body. Alternatively, the linear rack may be mounted cantilever on the servomotor body.

According to a preferred aspect of the invention, the servomotor body is articulated on the inner wall of the runner unit by means of a second pivot. Alternatively, the servomotor body may be secured to the inner wall of the runner unit.

According to a preferred aspect of the invention, the auxiliary servomotor is operated by oil.

According to a preferred aspect of the invention, the annular lever comprises a pin eccentric with respect to an axis of rotation of the annular lever, the pin being hosted in a groove formed in said piston.

According to a preferred aspect of the invention, the device further comprising a nut arranged around the pin and within the groove.

According to a preferred aspect of the invention, the main servomotor is operated by oil.

BRIEF DESCRIPTION OF THE DRAWINGS

The objects, advantages and other features of the present invention will become more apparent upon reading of the following non-restrictive description of preferred embodiments thereof, given for the purpose of exemplification only, with reference to the accompany drawing, through which similar reference numerals may be used to refer to similar elements, and in which.

An exemplary preferred embodiment will be now described with reference to the aforementioned drawings.

DETAILED DESCRIPTION OF THE INVENTION

Figure 1:
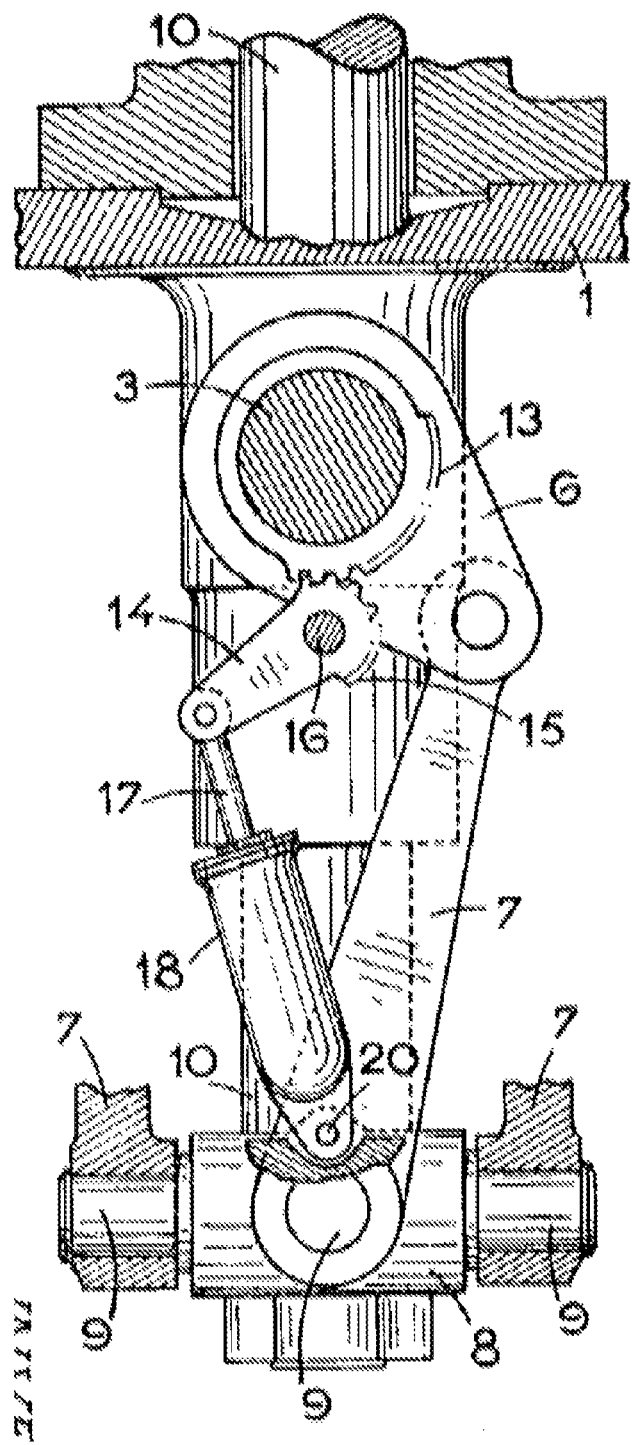
FIG. 1 shows a control mechanism for reversing a blade according to the prior art.
Figure 2:
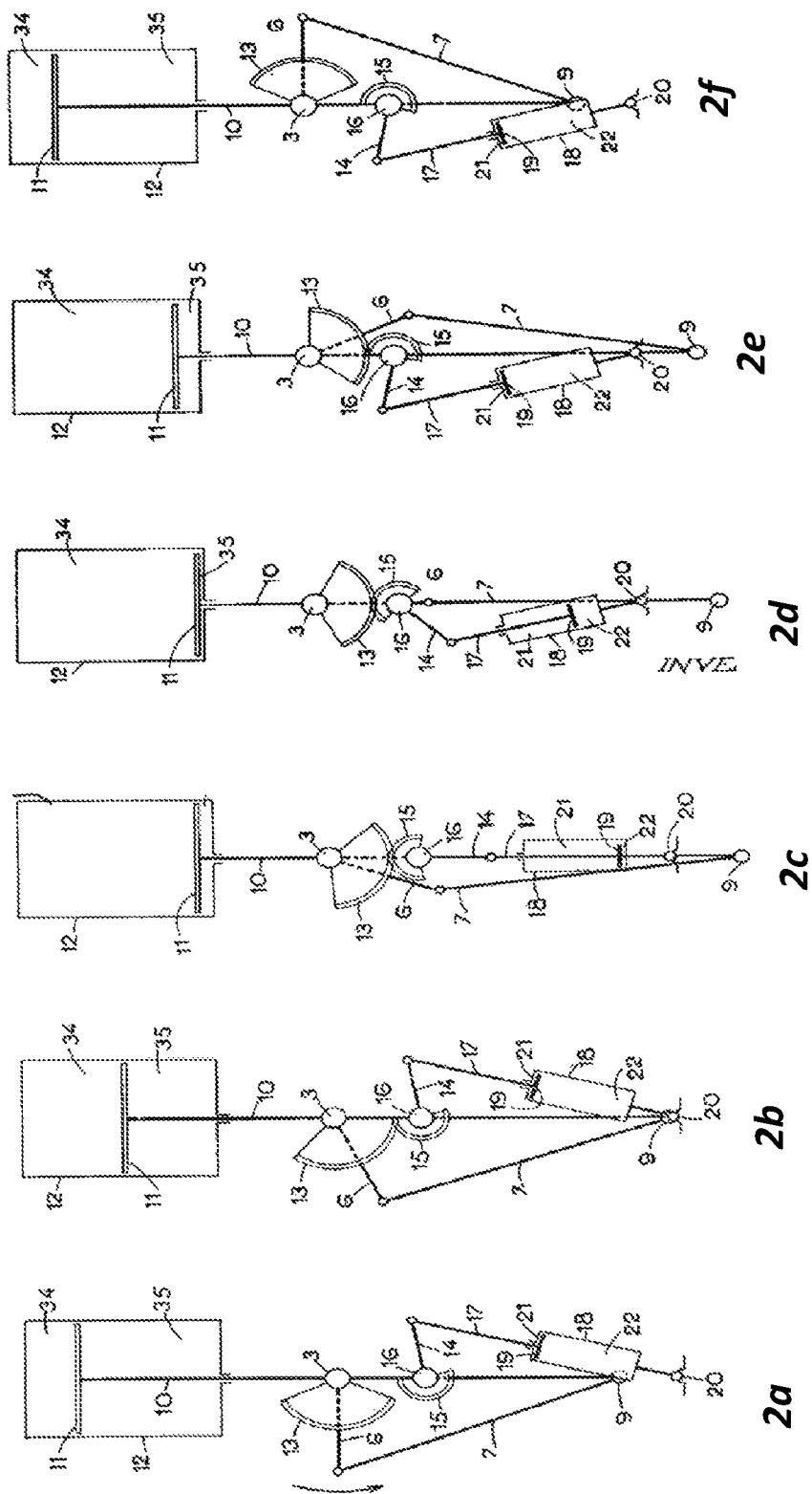
FIGS. 2a-2f show a sequence of the various configurations of the control mechanism of FIG. 1 during operation.
Figure 3:
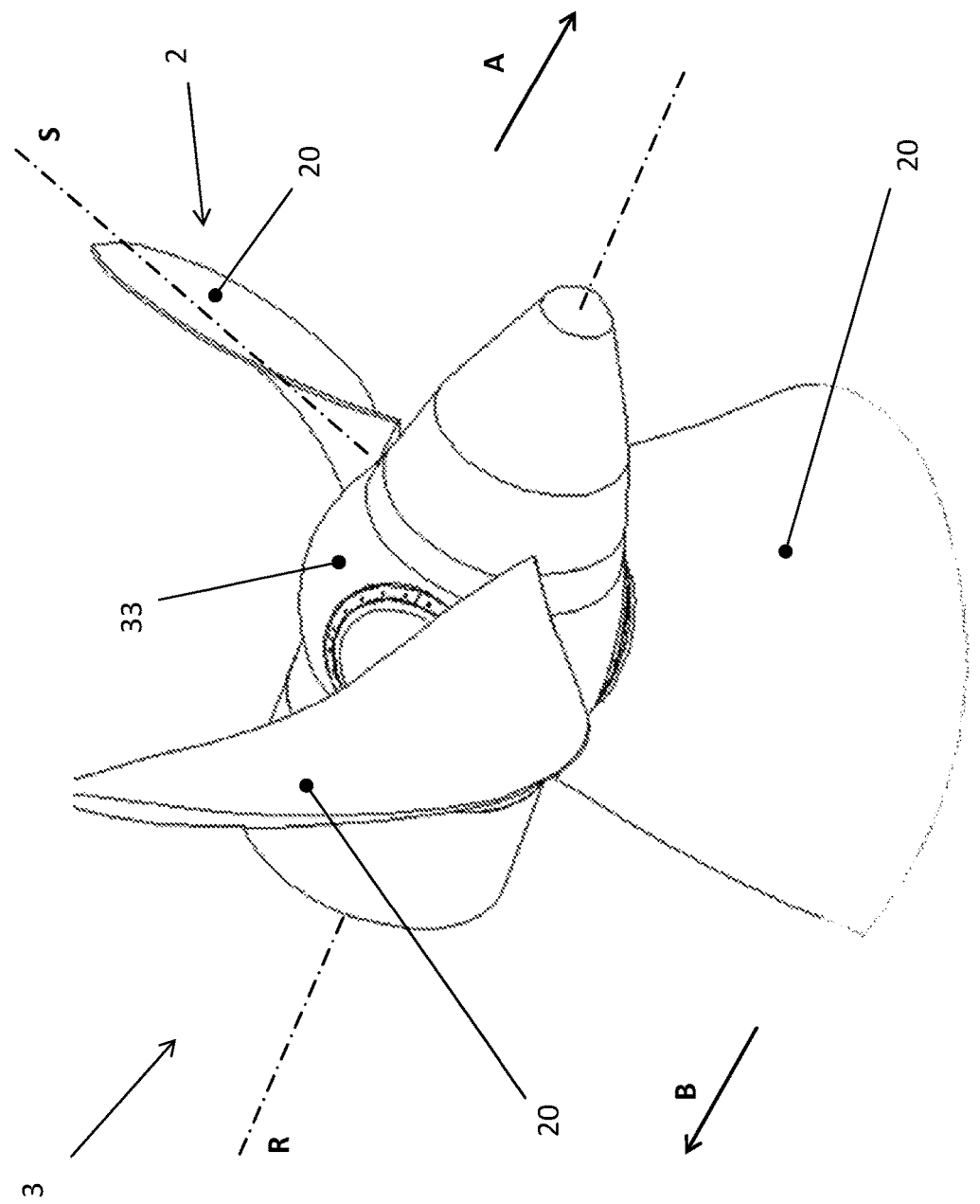
FIG. 3 shows a perspective view of a runner unit including a plurality of blades according to the present invention.

With reference to FIG. 3, it is shown a runner unit, generally indicated with numeral reference 3. The runner unit 3 is located within a tidal power plant which may be positioned between the sea and a lagoon basin (arrangement not shown). Runner unit 3 includes a hub body 33 to which a plurality of blades 2 are fitted. Each blade 2 comprises an airfoil 20 mounted on the hub body 33 and it is moved by a flow of water which may occur in a direct mode, that is from the lagoon to the sea along verse indicated by arrow A, and in a reverse mode, that is from the sea to the lagoon along verse indicated by arrow B. The flow of water generates a rotation of hub body 33 about an axis R that is transferred to a shaft (not visible) which is in turn connected to an electric generator (not shown) for the generating of electricity.

The following description is directed to a device for reversing a blade 2 around a rotational axis S arranged perpendicular to the hub body 33. It will be appreciated that a device according to the invention will be provided for each blade 2 of the runner unit 3.

Figure 4:
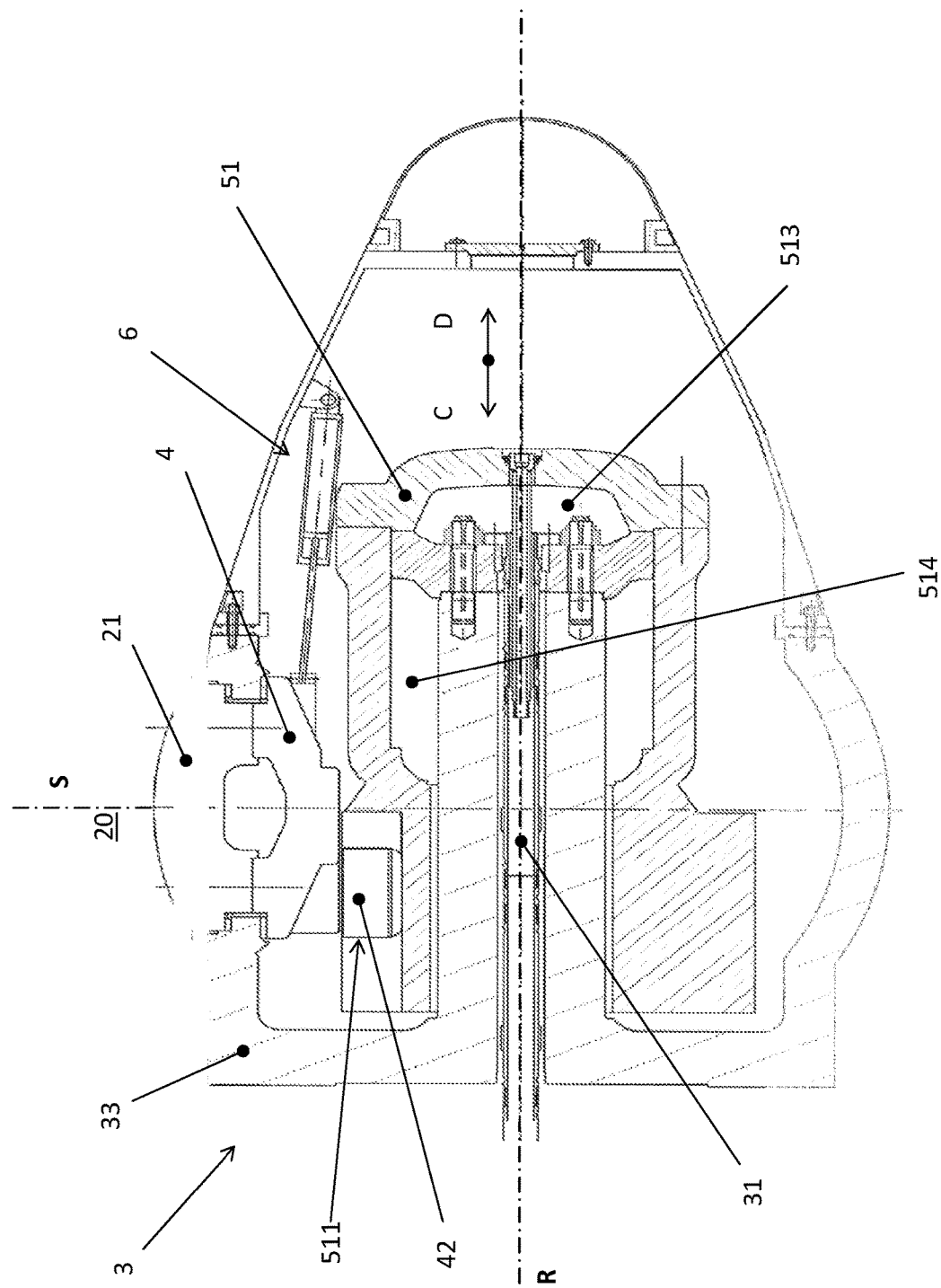
FIGS. 4 and 5 depict a cross and plant sectional views of the runner unit of FIG. 3, showing a device for reversing a blade according to the invention.

Making now reference to following FIG. 4, it is shown a section view of runner unit 3 along a plane which contains both axis rotational axis R and S. Airfoil 20 is rotatably connected to hub body 33 by means of a trunnion portion 21 of the blade which is secured to an annular level 4, rotatable about the axis S on the runner unit 3. Annular lever 4 is coupled to a main servomotor which comprises a piston 51 adapted to reciprocate along a shaft 31 of the runner unit 3. The coupling is arranged such that the position of the piston 51 along the shaft 31 determines the angular position of the blade with respect to rotational axis S, as it will be clear in the following detailed description of a preferred embodiment.

Preferably, the main servomotor is of an oil type, and the displacement of the piston 51 along indicated directions C or D occurs by controlling, by a dedicated pressured fluid feeding system (not shown), the difference of pressure established within chambers 513 and 514. More specifically, when the thrust created by the pressure in chamber 513 exceeds the thrust created by pressure of chamber 514 the piston moves along direction D, and vice versa.

Preferably, in this non-limiting exemplary embodiment the annular lever 4 and the piston 51 are coupled by means of a pin 42, integral to the annular lever 4 and eccentric versus axis S, that is the axis of rotation of the lever. Pin 42 is hosted into a groove 511 formed into the piston 51.

Figure 5:
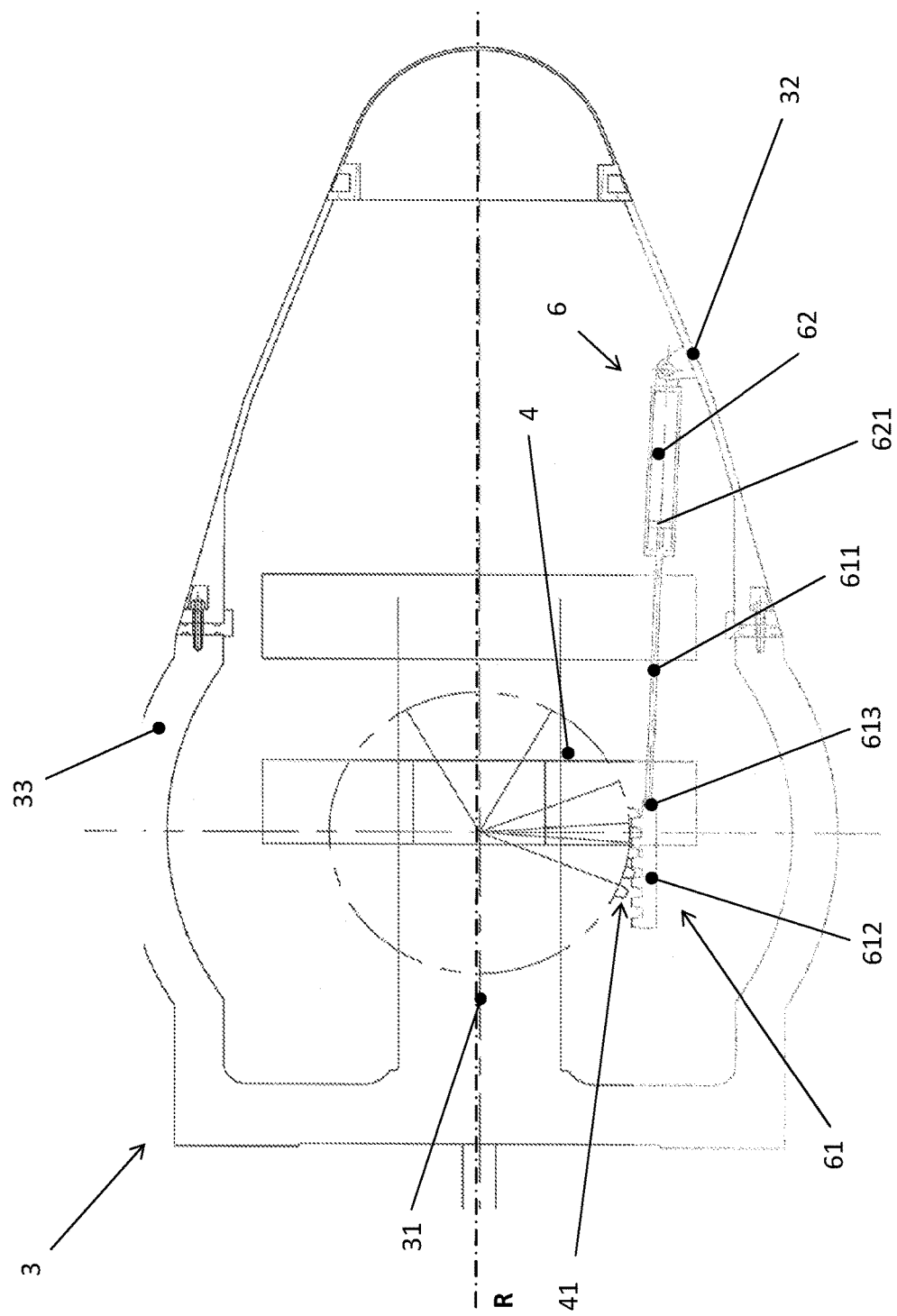

The device according to the invention further comprises an auxiliary servomotor 6 which will be better described with reference to next FIG. 5, depicting the runner unit 3 in a sectional view along a plane perpendicular to axis S. More in particular, auxiliary servomotor 6 comprises a reciprocating linear rack 61 which includes a rack element 612 articulated to a rod 611 by means of a first pivot arranged at an end 613 of the rod 611. Alternatively, rack element 612 may also be fixed to the rod 611. In this exemplary and non-limiting embodiment, auxiliary servomotor 6 is of a oil type, and comprises a servomotor body 62 hosting a reciprocating piston 621 integral to the linear rack 61. The linear rack 61 is preferably mounted cantilever on the servomotor body 62, which is articulated to an inner wall 32 by means of a second pivot. Alternatively, the servomotor body 62 may be secured to the inner wall 32 of the hub body 33.

Still with reference to FIG. 5, the rack element 612 is configured to cooperate with a toothed sector 41 provided on the annular lever 4 to cause a further rotation of the blade, additional to the rotation established by the main servomotor.

With reference to the following sequence of FIGS. 6-11 the mode of operation of the device for reversing the blade will be described in details.

FIGS. 6-11 show on the right a schematic representation of the device for reversing the blade 2 according to the invention for subsequent angular positions of the blade during the inversion. On the left side it is shown the device within the runner unit in the two correspondent sectional views described in preceding FIGS. 4 and 5.

Figure 6:
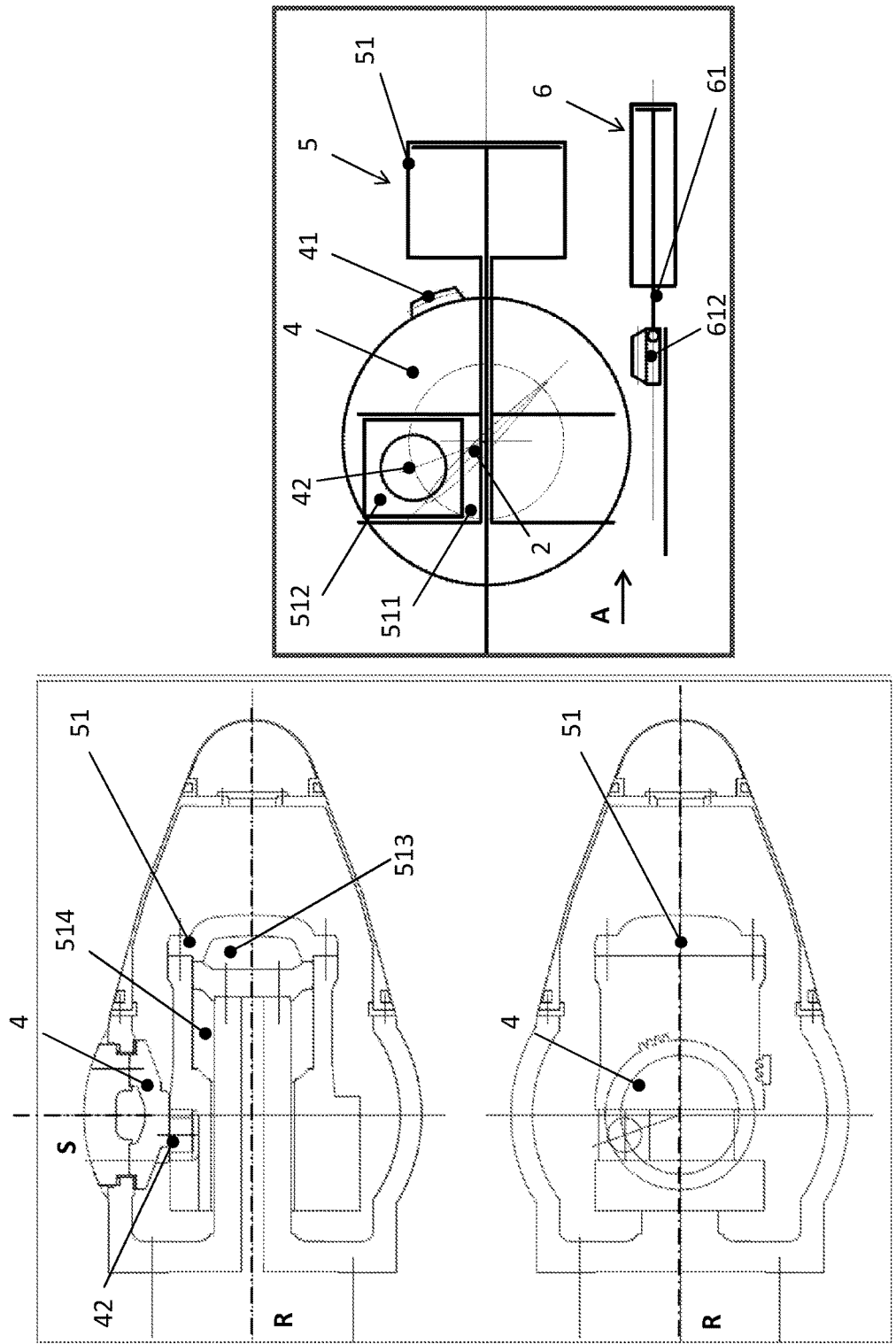
FIG. 6-11 show a sequence of the various configurations of the device for reversing a blade during operation.

With reference to FIG. 6, it is shown a normal functioning of the runner unit in a direct mode with the flow of water oriented along direction A. Blade 2 has a pitch with respect to water flow such to maximise the conversion of energy by enabling the rotation of the shaft of the runner around axis R. As it is clearly visible, in such configuration toothed sector 41 of annular lever 4 and the rack element 612 of auxiliary servo motor 6 do not mesh. When the flow of water inverts the direction, blade 2 has to be reversed in order to elaborate the inversed flow of water, for the energy conversion process, with the quite same efficiency as for the direct flow. As detailed above, the main servomotor (generally indicated in the sequence of FIGS. 6-11 with numeral reference 5) determines the angular position of the lever 4, and consequently of the blade 2, by displacing the eccentric pin 42 which is hosted in groove 511 formed in piston 51. More in particular, as pin 42 has a circular section and the groove a square one, a nut 512 is arranged around pin 42 and within the groove 511.

Figure 7:
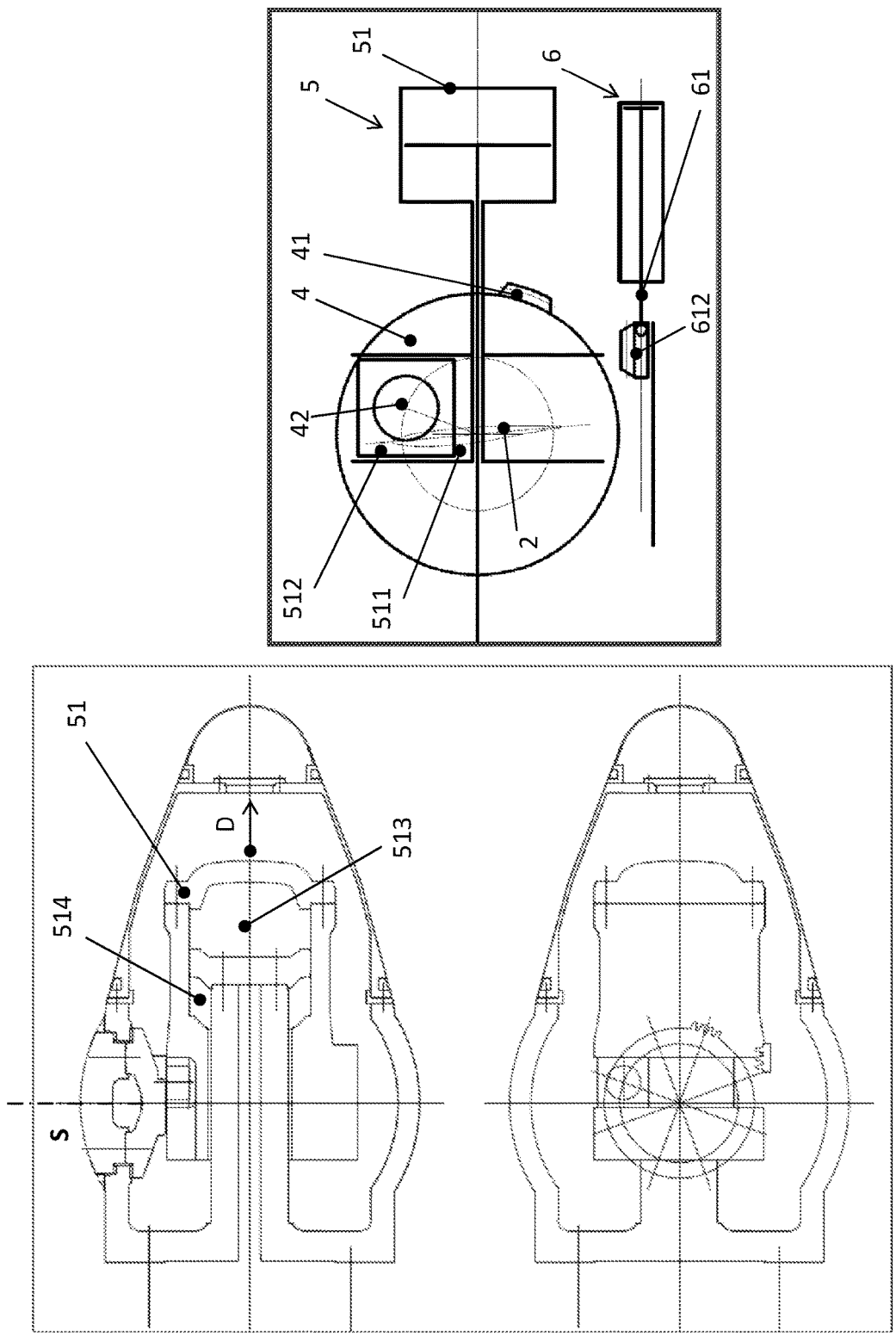

FIG. 7 shows the initial step of the inversion of the blade 2 during transition when the runner unit is stopped. Piston 51 is moved towards direction D by means of an over pressure established in chamber 513 with respect to chamber 514. As a consequence, pin 42 is dragged by the groove 511 and thus the lever 4 is caused to achieve a first rotation about the axis S.

Figure 8:
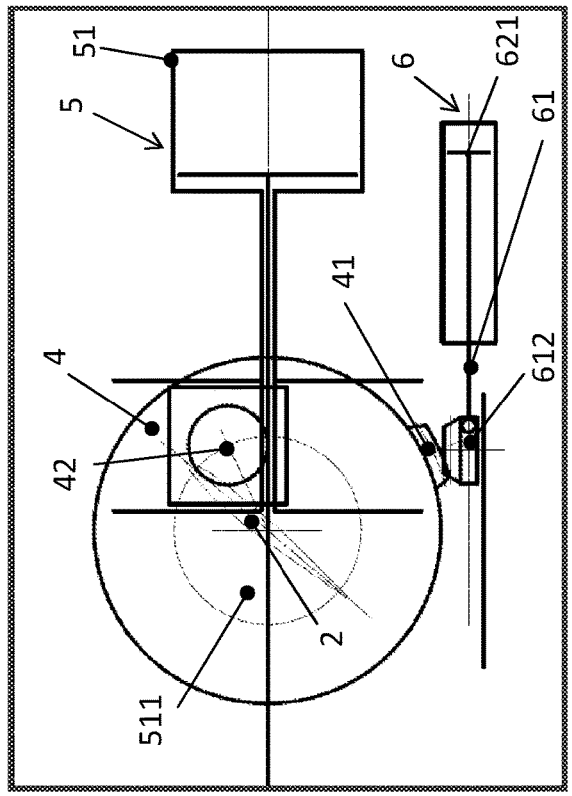
Figure 8:
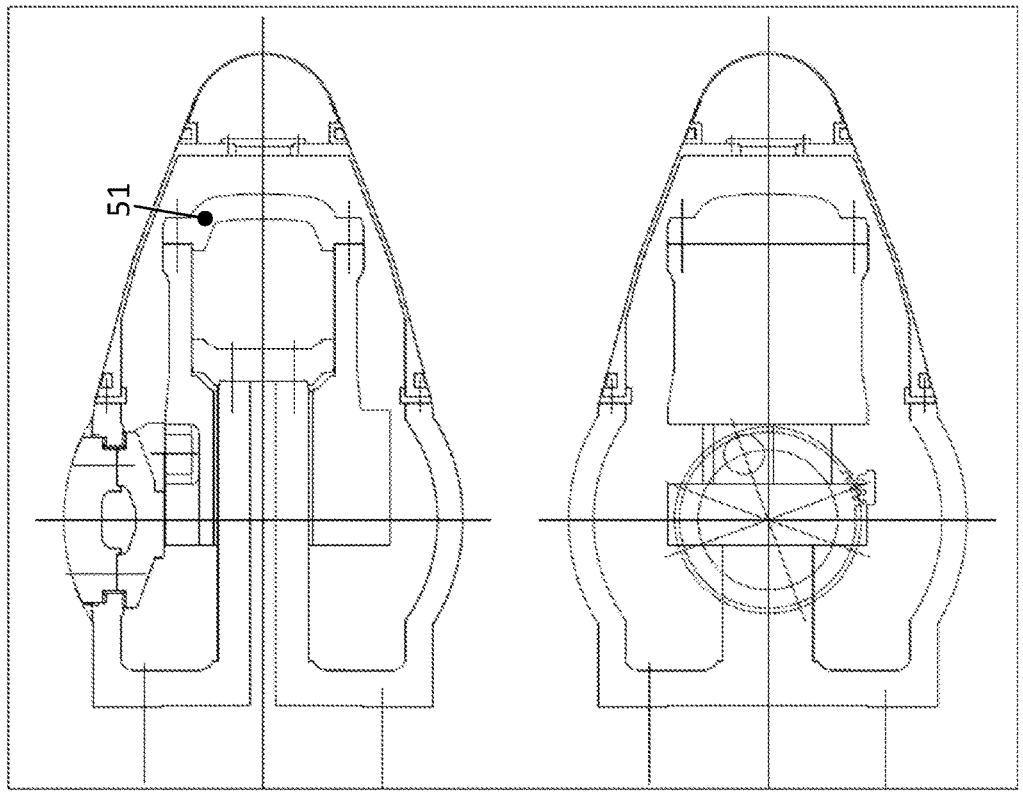

With reference to FIG. 8, it is shown the piston 51 which has substantially reached the end of its path and thus it is at or at least in the proximity of a dead zone position. In such configuration, auxiliary servomotor 6 is arranged such that rack element 612 starts engaging with tooth sector 41. At this point, piston 621 is driven by servomotor 6 to linearly slide rack 61 such to cause the lever 4, by means of the coupling between toothed sector 41 and rack element 612, to further rotate and pass the dead zone position.

Figure 9:
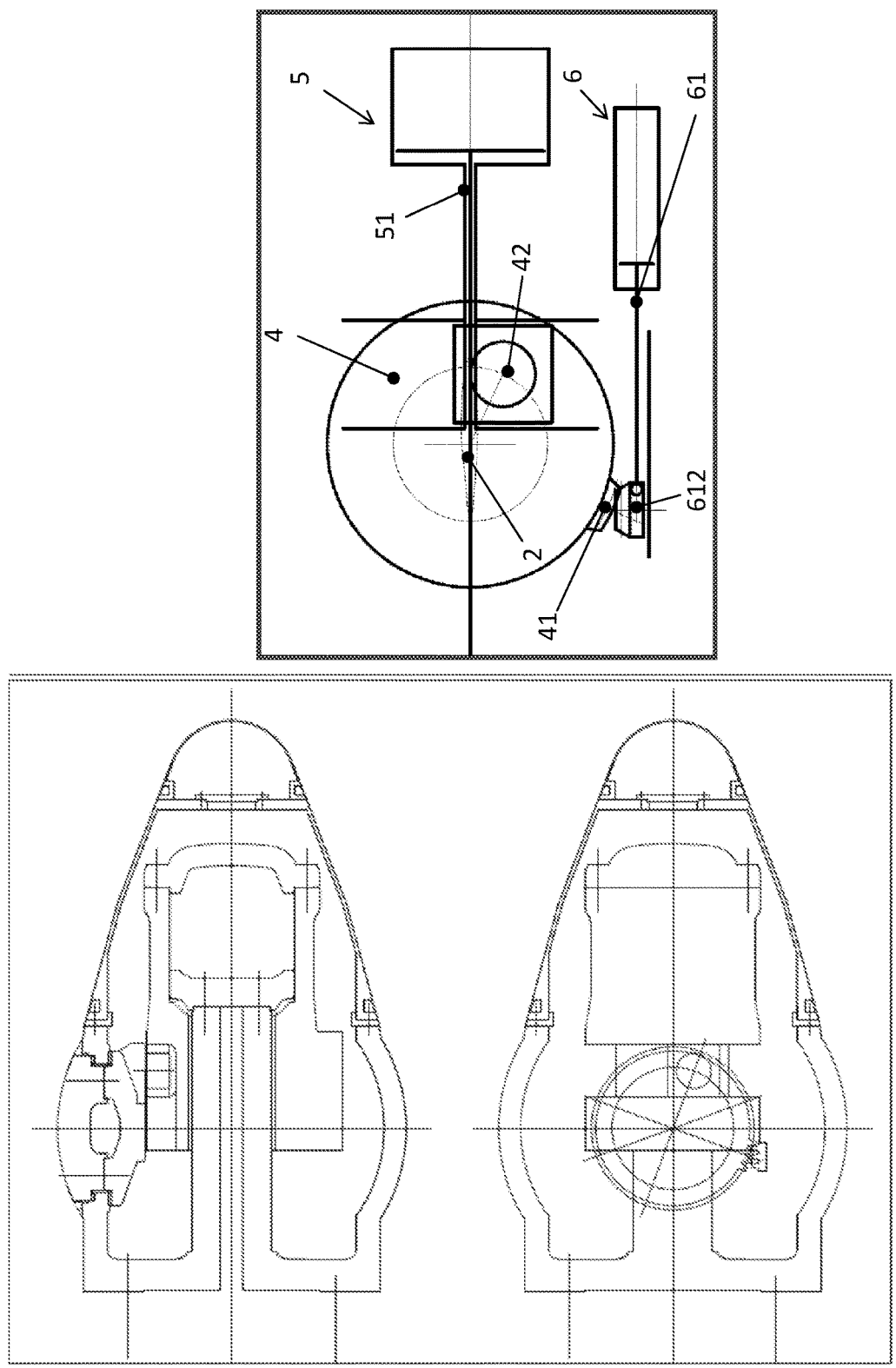

FIG. 9 shows the end position of lever 4 with toothed sector 41 and rack element 612 meshing.

Figure 10:
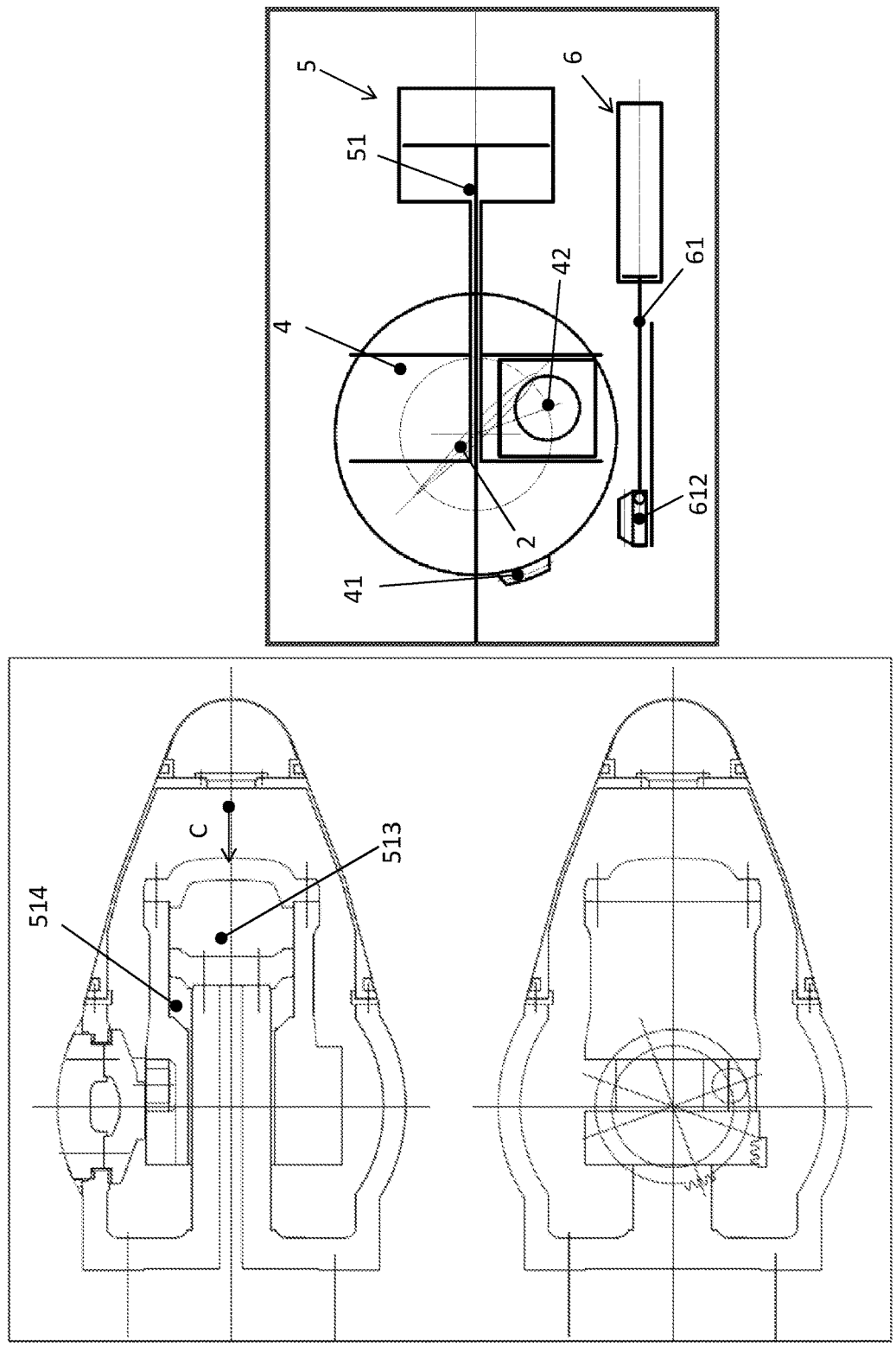

With reference to FIG. 10, having passed the dead zone, servomotor 5 may start acting on lever 4 again by moving piston 51 along opposite direction C, this time establishing an overpressure in chamber 514 versus chamber 513. This determines the rotation of the lever 4 until the final pitch of the reverse mode is achieved, as shown in last FIG. 11, where the flow of water has been reversed and it is now directed along arrow B.

Figure 11:
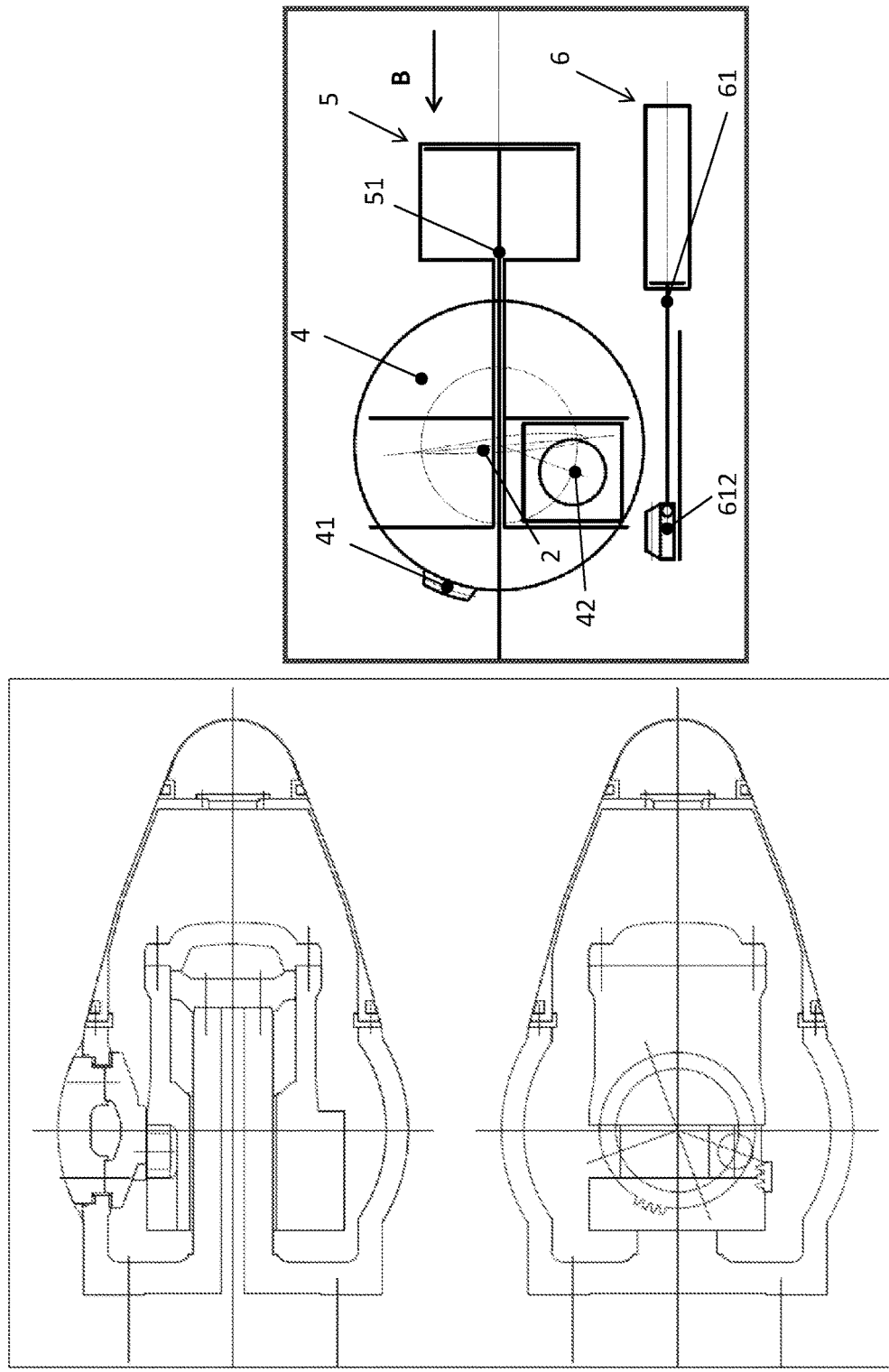

It will be appreciated that, from the reversed mode depicted in FIG. 11 it is possible to return to the pitch of the blade of the direct mode shown in FIG. 6, by reversing all the operations of the device above described.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A device for reversing a blade of a runner unit, the device comprising:
    an annular lever fixed to a trunnion portion of the blade and rotatably mounted on the runner unit;
    a main servomotor comprising a piston adapted to reciprocate along a shaft of the runner unit and coupled to said annular lever such to cause a first rotation of the blade until said piston reaches a dead zone position;
    an auxiliary servomotor arranged to cause a further rotation of the blade;
    wherein said auxiliary servomotor comprises a reciprocating linear rack configured to cooperate with a toothed sector provided on said annular lever when said piston is at or in proximity of said dead zone position.

2. The device according claim 1, wherein said linear rack comprises a rod having a rack element articulated at its end.

3. The device according to claim 1, wherein said auxiliary servomotor comprises a servomotor body hosting a reciprocating piston integral to said linear rack.

4. The device according to claim 3, wherein said linear rack is mounted cantilever on said servomotor body.

5. The device according to claim 3, wherein said servomotor body is articulated to an inner wall of the runner unit.

6. The device according to claim 1 wherein said auxiliary servomotor is oil-operated.

7. The device according to claim 1, wherein said annular lever comprises a pin eccentric with respect to an axis of rotation of said annular lever, said pin being hosted in a groove formed in said piston.

8. The device according to claim 7, further comprising a nut arranged around said pin and within said groove.

9. The device according to claim 1, wherein said main servomotor is oil-operated.

10. A runner unit comprising at least one blade rotatably mounted thereon, and the device according to claim 1 for reversing the at least one blade.

* * * * *